(12) United States Patent
Furuya

(10) Patent No.: US 9,386,138 B2
(45) Date of Patent: Jul. 5, 2016

(54) MOBILE TERMINAL DEVICE, OPERATION PROCEDURE COMMUNICATION SYSTEM, AND OPERATION COMMUNICATION METHOD

(75) Inventor: Tomoki Furuya, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 996 days.

(21) Appl. No.: 13/578,862

(22) PCT Filed: Jan. 26, 2011

(86) PCT No.: PCT/JP2011/052072
§ 371 (c)(1),
(2), (4) Date: Aug. 14, 2012

(87) PCT Pub. No.: WO2011/099403
PCT Pub. Date: Aug. 18, 2011

(65) Prior Publication Data
US 2012/0309378 A1    Dec. 6, 2012

(30) Foreign Application Priority Data
Feb. 15, 2010 (JP) .................... 2010-029751

(51) Int. Cl.
| | |
|---|---|
| H04M 3/00 | (2006.01) |
| H04M 1/725 | (2006.01) |
| G06F 3/0482 | (2013.01) |
| G06F 9/44 | (2006.01) |
| H04L 29/08 | (2006.01) |

(52) U.S. Cl.
CPC ......... *H04M 1/72519* (2013.01); *G06F 3/0482* (2013.01); *G06F 9/4446* (2013.01); *H04L 67/22* (2013.01); *H04M 2250/56* (2013.01)

(58) Field of Classification Search
CPC ..... H04W 8/245; H04W 24/02; H04W 88/02; H04W 92/08; H04M 1/72525; H04M 1/72522; H04M 1/247; H04M 11/00; H04M 2250/56; H04M 1/72; G06F 17/30893; G06F 17/30067; G06F 17/30144; G06F 3/048
USPC ........... 455/436, 560, 88, 445, 466, 561, 557, 455/553.1, 418; 370/335, 337, 522, 331, 370/347; 375/242, 354
See application file for complete search history.

(56) References Cited

U.S. PATENT DOCUMENTS

| | | | |
|---|---|---|---|
| 7,469,260 B2 * | 12/2008 | Enko ................ | G06F 17/30067 |
| 2003/0002637 A1 * | 1/2003 | Miyauchi ............... | H04M 3/10 |
| | | | 379/93.01 |

(Continued)

FOREIGN PATENT DOCUMENTS

| | | |
|---|---|---|
| CN | 101267632 A | 9/2008 |
| JP | 2001526484 A | 12/2001 |

(Continued)

OTHER PUBLICATIONS

Torii Kuniari et al. (JP 2008048151 A)—Mobile Communication System, Mobile Terminal Apparatus, Help Providing Apparatus, and Help Providing Method Used for Them, NEC Corp, Feb. 28, 2008, All pages.*

(Continued)

*Primary Examiner* — Mahendra Patel

(57) ABSTRACT

An operation procedure communication system includes an information processing device for communicating an operation procedure and an information processing device for receiving the operation procedure. The information processing device for communicating the operation procedure includes: an operation acquisition unit for identifying and storing an input applied to an own terminal device and various states of the own terminal device in a period from application of a first predetermined operation to application of a second predetermined operation; an operation conversion unit for converting operation log stored by the operation acquisition unit to a text and/or a file to be reproduced as depiction; and an operation procedure transmission unit for transmitting an operation explanation acquired by the conversion by the operation conversion unit via communications means. The information processing device for receiving the operation procedure includes an operation procedure presenting unit for presenting the operation explanation which is transmitted from the information processing device for communicating the operation procedure and acquired via the communications means to a user.

9 Claims, 14 Drawing Sheets

(56) References Cited

U.S. PATENT DOCUMENTS

| | | | | |
|---|---|---|---|---|
| 2003/0105821 | A1* | 6/2003 | Shah | H04L 12/5855 709/206 |
| 2003/0212739 | A1* | 11/2003 | Boucher | H04L 29/06 709/203 |
| 2007/0192378 | A1* | 8/2007 | Atchison | G06F 17/30893 |
| 2008/0148398 | A1* | 6/2008 | Mezack | G06F 21/55 726/22 |
| 2008/0177994 | A1* | 7/2008 | Mayer | G06F 9/4418 713/2 |
| 2009/0077136 | A1* | 3/2009 | Igawa | G06F 17/30144 |

FOREIGN PATENT DOCUMENTS

| | | |
|---|---|---|
| JP | 2005-100016 A | 4/2005 |
| JP | 2008-48151 A | 2/2008 |
| JP | 2008-117028 A | 5/2008 |
| JP | 2009-232359 A | 10/2009 |
| JP | 2009232359 A * | 10/2009 |
| JP | 2009272663 A | 11/2009 |

OTHER PUBLICATIONS

Iwabuchi Hiroteru et al., ( JP 2009232359 A) , Operation Support Device for Cellular Phone, Fujitsu Ltd, Oct. 8, 2009, All pages.*

Communication dated Sep. 24, 2014 from the Japanese Patent Office in counterpart application No. 2011-553807.

Akihiko Yabu, "Viewlet Builder 3 Pro Web Demo", Internet Magazine 2nd Stage, Aug. 1, 2003, p. 152, No. 103.

Office Action, dated Feb. 21, 2014, issued by the State Intellectual Property Office of the People's Republic of China, in counterpart Application No. 201180008926.X.

* cited by examiner

| MODEL NUMBER: XXXXXX | | | |
|---|---|---|---|
| SERIAL NUMBER | OPERATION CONDITION | DISPLAYED STRING | OPERATION NUMBER |
| 0001 | "MENU" BUTTON, SHORT PUSH | PRESS "MENU" KEY ONCE | 0001a |
| 0002 | "MENU" BUTTON, LONG PUSH | PRESS "MENU" KEY LONGER | 0001b |
| 0003 | "MAIL" BUTTON, SHORT PUSH | PRESS "MAIL" KEY ONCE | 0002a |
| 0004 | "MAIL" BUTTON, LONG PUSH | PRESS "MAIL" KEY LONGER | 0002b |
| 0005 | "TV" BUTTON, SHORT PUSH | PRESS "TV" KEY ONCE | 0003a |
| 0006 | "TV" BUTTON, LONG PUSH | PRESS "TV" KEY LONGER | 0003b |
| . | . | . | . |
| . | . | . | . |
| 0030 | "0" BUTTON, SHORT PUSH | PRESS "0" KEY ONCE | 0010a |
| 0031 | "0" BUTTON, LONG PUSH | PRESS "0" KEY LONGER | 0010b |
| 0030 | "1" BUTTON, SHORT PUSH | PRESS "1" KEY ONCE | 0011a |
| 0031 | "1" BUTTON, LONG PUSH | PRESS "1" KEY LONGER | 0011b |
| . | . | . | . |
| . | . | . | . |
| 0100 | "↑" OF CROSS KEY, SHORT PUSH | PRESS UP [↑] OF "CROSS KEY" ONCE | 0020a |
| 0101 | "↑" OF CROSS KEY, LONG PUSH | PRESS UP [↑] OF "CROSS KEY" LONGER | 0020b |
| 0102 | "→" OF CROSS KEY, SHORT PUSH | PRESS RIGHT [→] OF "CROSS KEY" ONCE | 0020a |
| 0103 | "→" OF CROSS KEY, LONG PUSH | PRESS RIGHT [→] OF "CROSS KEY" LONGER | 0020b |
| . | . | . | . |
| . | . | . | . |
| 0120 | "CENTER" OF CROSS KEY, SHORT PUSH | PRESS CENTER BUTTON OF "CROSS KEY" ONCE | 0030a |
| 0121 | "CENTER" OF CROSS KEY, LONG PUSH | PRESS CENTER BUTTON OF "CROSS KEY" LONGER | 0030b |
| . | . | . | . |
| . | . | . | . |

MODEL NUMBER : AAA

| SERIAL NUMBER | OPERATION CONTENT | DISPLAYED STRING | OPERATION NUMBER | MANUAL PAGE |
|---|---|---|---|---|
| A001 | DECISION OPERATION | PRESS CENTER BUTTON OF "CROSS KEY" ONCE | A001 | P10 |
| A002 | SELECT MAIL ICON | PRESS "MAIL" KEY ONCE | A002 | P11 |
| A003 | SELECT TV ICON | PRESS "TV" KEY ONCE | A003 | P11 |
| ... | ... | ... | ... | ... |
| A030 | START TV APPLICATION | PRESS "TV" KEY ONCE | A030 | P105 |
| A031 | DISPLAY TV PROGRAM TABLE | PRESS "TV" KEY LONGER | A031 | P105 |
| ... | ... | ... | ... | ... |
| A300 | SET TYPE OF CLOCK | SELECT CLOCK TYPE | B042 | P108 |
| A301 | AUTOMATIC SETTING OF TIME | ENABLE AUTOMATIC ACQUISITION OF TIME | B044 | P109 |
| ... | ... | ... | ... | ... |
| A420 | SET RINGTONE | SET RINGTONE OR RING VOLUME | B042 | P50 |
| A421 | SET VIBRATION | SET RINGTONE →VIBRATION→TYPE | B044 | P94 |
| A422 | SET VIBRATION | FUNCTION→054→OK | B045 | P94 |
| A504 | SET BRIGHTNESS OF SCREEN | SELECT NORMAL FOR SCREEN DISPLAY SETTING | B054 | P60 |
| ... | ... | ... | ... | ... |
| A800 | SET INTERNATIONAL PREFIX | SELECT INTERNATIONAL DIAL ASSISTANCE SETTING | F001 | P502 |
| ... | ... | ... | ... | ... |

OPERATION STEPS
FOR STARTING CAMERA :

1. PRESS "Menu" KEY ONCE
2. PRESS RIGHT [→] OF
   "CROSS KEY" ONCE
3. PRESS CENTER BUTTON OF
   "CROSS KEY" ONCE

CAMERA STARTS WITH ABOVE
OPERATIONS ON INITIAL
SCREEN

DISPLAY EXAMPLE

FIG. 13

MOBILE TERMINAL DEVICE, OPERATION PROCEDURE COMMUNICATION SYSTEM, AND OPERATION COMMUNICATION METHOD

CROSS REFERENCE TO RELATED APPLICATIONS

This application is a National Stage of International Application No. PCT/JP2011/052072 filed on Jan. 26, 2011, which claims priority from Japanese Patent Application No. 2010-029751, filed on Feb. 15, 2010, the contents of all of which are incorporated herein by reference in their entirety.

TECHNICAL FIELD

This invention relates to a mobile communication system, and more particularly, to a mobile telephone device, an operation procedure communication system, and an operation communication method, which carries out communication about an operation procedure of a mobile terminal from a respondent to another recipient.

BACKGROUND ART

Various functions are recently available on a mobile terminal device used in a mobile communication system represented by 3G. The various functions available on the mobile terminal device require operations on either one or both of software and hardware. Moreover, an operation for activating a desired function has become complicated. The operation on the mobile terminal device can become more complicated as the mobile communication system develops in the future. The various functions include a camera function, a television receiving function, a reproduction function of an integrated projector, a setting function of enabling/disabling a motion sensor, a remote operation function of home electric appliances, and so on.

It is preferred that the operation of the mobile terminal device be easy for a user. However, the operation of the mobile terminal device incorporating the various functions tends to be complicated. Therefore, a user who is not familiar with the mobile terminal device often does not know operation procedures of the various functions. Moreover, even a user who is familiar with the mobile terminal device often encounters a function for which the user does not know operation procedures. In order to address this case, a vendor of the mobile terminal device distributes an operation manual (user guide) to users.

On the other hand, a user often would often ask an acquaintance or friend to teach him or her an operation method. This is because the user might want to save labor for consulting or searching the operation manual, or an operation the user wants to know cannot be quickly found out from the operation manual. In this event, the acquaintance who is asked for the explanation of the operation method might actually manually receive the mobile terminal device from the user who asked for the explanation and might often explain the operation in question by the use of the received mobile terminal device.

The problem is often solved by the acquaintance explaining the operation while directly operating the mobile terminal device as mentioned above. Solving such problem would be based on the fact that the acquaintance gives the explanation in consideration of a knowledge level and operation capability of the person asking questions. On the other hand, in a case where the acquaintance only operates the mobile terminal device without providing the explanation, the person asking questions may repeat the same questions on the mobile terminal device in the future.

As a problem different from the above-mentioned one, it is often the case that an acquaintance who answers the question cannot directly operate the mobile terminal device. For example, a person whose knowledge level regarding the mobile terminal device is high enough to explain an operation, and who is also kind enough to teach an operation in response to a request from the person asking questions is remote from the person asking questions. In this case, the person asking questions may request the acquaintance to teach the operation procedures by means of telephone, electronic mail, short mail, or the like.

By the way, a technology relating to the mobile terminal device is described in Patent Literature 1, for example. The mobile communication terminal (mobile terminal device) described in Patent Literature 1 may be, for example, a mobile phone of a PDC (Personal Digital Cellular) type including an MPU (control unit), a ROM, a RAM, an operation input unit, a display unit, a wireless unit, and an imaging unit. The mobile phone has a configuration including a user authentication module, an operation program registration/editing module, and an operation program execution module, and the like to store as an operation program (file) a series of operations on the operation input unit specified by the user, and executes the operation program via an electric mail, thereby reproducing the operations.

CITATION LIST

Patent Literature 1: Japanese Unexamined Patent Application Publication (JP-A) No. 2005-100016

DISCLOSURE OF THE INVENTION

Problem to be Solved by the Invention

Even if the acquaintance who is requested by the person asking questions to teach the operation procedures decides to teach the person asking questions the operation procedure, it is difficult for the acquaintance to provide a precise and appropriate instruction via telephone or mail. Moreover, the acquaintance seldom clearly understands a difference in operation between the model of the person asking questions and the own model. In addition, as the diversity of functions increases, labor required for the acquaintance to provide the explanation tends to increase.

One aspect of this invention is to provide a mobile terminal device for facilitating teaching of a requested operation method to a person having the mobile terminal device on which the person wants to apply the operation.

Moreover, another aspect of this invention is provide an operation procedure communication system for facilitating teaching of a requested operation method to a person having a mobile terminal device on which the person wants to apply the operation.

Means to Solve the Problem

According to an aspect of this invention, there is provided a mobile terminal device which includes: an operation acquisition unit for identifying and storing an operation applied to the own mobile terminal device in a period from application of a first predetermined operation to application of a second predetermined operation; an operation conversion unit for converting operation log stored by the operation acquisition unit into data as an operation explanation to be presented to a person receiving explanations; and an operation procedure transmission unit for transmitting the operation explanation converted into the data by the operation conversion unit via communication means.

According to another aspect of this invention, there is provided an operation procedure communication system which includes: an information processing device for communicating an operation procedure, including: an operation acquisition unit for identifying and storing an input applied to an own terminal device and various states of the own terminal device in a period from application of a first predetermined operation to application of a second predetermined operation; an operation conversion unit for converting operation log stored by the operation acquisition unit into a text and/or a file to be reproduced as depiction; and an operation procedure transmission unit for transmitting an operation explanation acquired by the conversion by the operation conversion unit via communication means; and an information processing device for receiving the operation procedure, including an operation procedure presenting unit for presenting the operation explanation transmitted from the information processing device for communicating the operation procedure and acquired via the communication means to a user.

Effect of the Invention

According to this invention, a mobile terminal device serves is effective in that a requested operation procedure can be easily informed to a person who had the mobile terminal device and who wants to apply the procedure.

Similarly, a communication method according to this invention is advantageous in that a requested procedure can be easily informed to a person who had a mobile terminal device and who wants to execute the requested procedure.

BRIEF DESCRIPTION OF DRAWING

FIG. 3 is an explanatory diagram illustrating an example of a procedure correspondence table used in a texting process.

FIG. 9 is an explanatory diagram illustrating an example of a procedure correspondence table used for a texting process according to the fourth embodiment.

FIG. 13 is an explanatory diagram illustrating an example of a sentence conversion of the operation of starting the camera according to the first embodiment.

BEST MODE FOR EMBODYING THE INVENTION

A description is now made about embodiments of this invention referring to FIGS. 1 to 14.

According to a first embodiment of this invention, an acquaintance (namely, a respondent) who receives a question about an operation carries out a specified operation on a mobile terminal device according to this invention, and steps or processes of the operation applied to the mobile terminal device are automatically converted into a sentence or dynamically converted into a file. The converted sentence or file is transmitted to a person (namely, a recipient) asking questions. An operation explanation (operation procedures) converted into a sentence and a file in response to what is asked can be returned to the person (recipient) asking questions via an electronic mail or the like by operating the mobile terminal device in this way.

Figure 1:
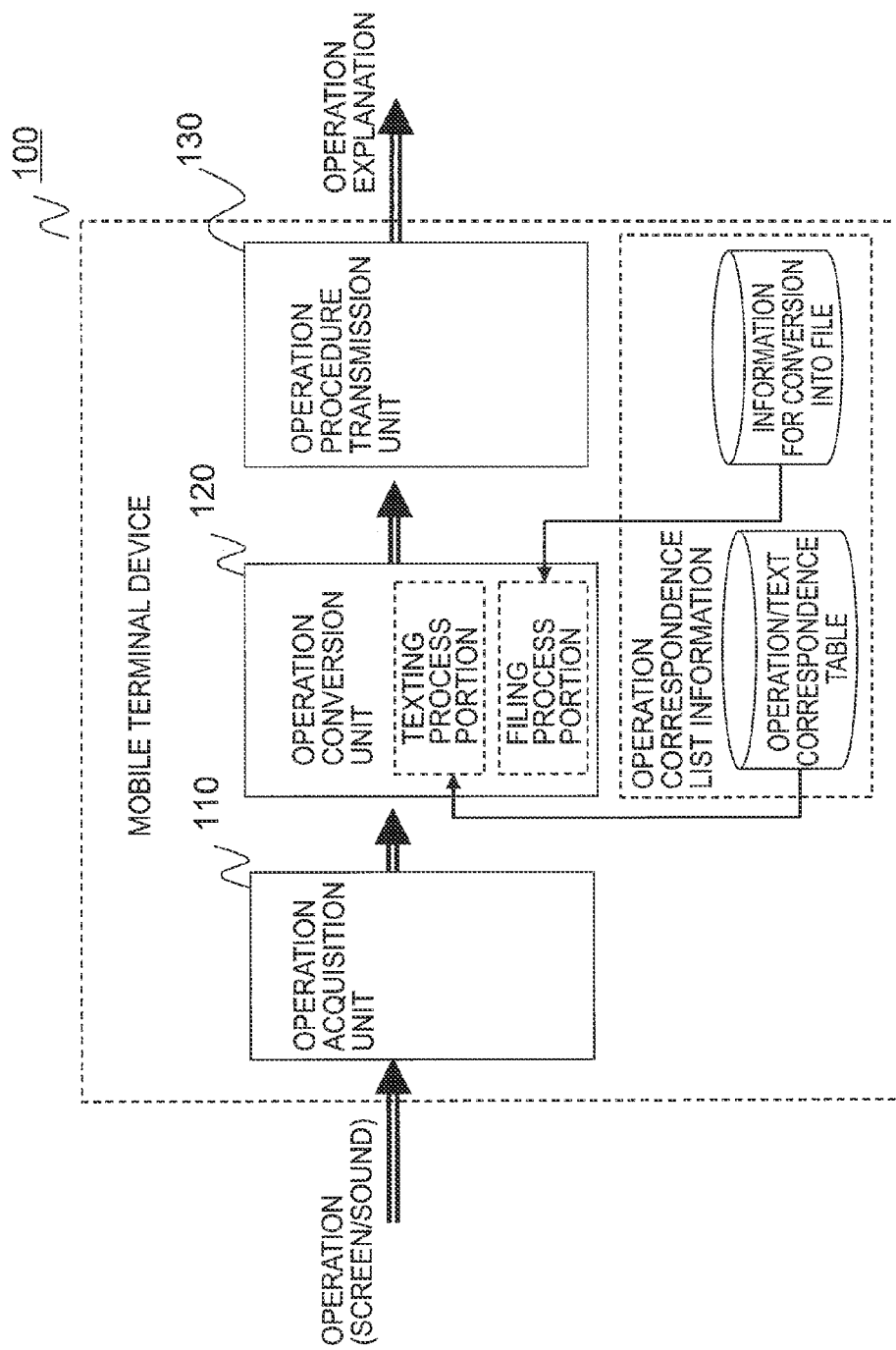
FIG. 1 is a block diagram illustrating a part of a mobile terminal device 100 according to a first embodiment.

FIG. 1 is a block diagram illustrating a part of a mobile terminal device 100 according to the first embodiment.

The mobile terminal device 100 has a communication function in addition to the five functions as the information processing device. In other words, the mobile terminal device 100 includes a control unit (arithmetic and control unit), an input unit, an output unit, a storage unit, and a communication unit, and operates in accordance with programs.

Moreover, the mobile terminal device 100 includes an operation acquisition unit 110, an operation conversion unit 120, and an operation procedure transmission unit 130.

The operation acquisition unit 110 is configured to detect a predetermined operation applied by a user to the mobile terminal device 100. And, the operation acquisition unit 110 identifies and stores one or more operations applied to the mobile terminal device 100, in the storage unit until the operation acquisition unit 110 detects a predetermined operation later applied to the mobile terminal device 100. The operation acquisition unit 110 may be also configured to identify a screen display and a sound from a microphone at the time of operations carried out during the predetermined period, and to store the screen display and the sound along with the operations. Moreover, the operation acquisition unit 110 may be configured to identify various operation states (terminal angle, and states of various switches, and so on) of the own terminal at the time of operations carried out during the predetermined period, and to store the states along with the operations.

The operation conversion unit 120 is configured to convert an operations recorded by the operation acquisition unit 110 in the storage unit into a text and a file for reproducing the operations in the form of a depiction as an operation explanation. During the conversion, the operation conversion unit 120 refers to an operation correspondence list information stored in advance, and acquires information on sentences and images to be presented to a person (recipient) asking questions in response to the input operations. It should be noted that description will be specifically made later about the conversion into a text and conversion into a file.

The operation procedure transmission unit 130 is configured to transmit the operation explanation produced by the operation conversion unit 120 via the wireless unit owned by the own terminal to a mobile terminal device 200 (not shown) of the person asking questions. The transmission may be carried out by means of Bluetooth (trademark) or FeliCa (trademark) in place of the wireless unit.

This configuration makes it possible that the owner of the mobile terminal device 100 according to the first embodiment can easily teach the requested operation procedure to the person (recipient) asking questions holding the mobile terminal device 200.

A description is now given of an operation of the mobile terminal device 100 according to the first embodiment.

Figure 2:
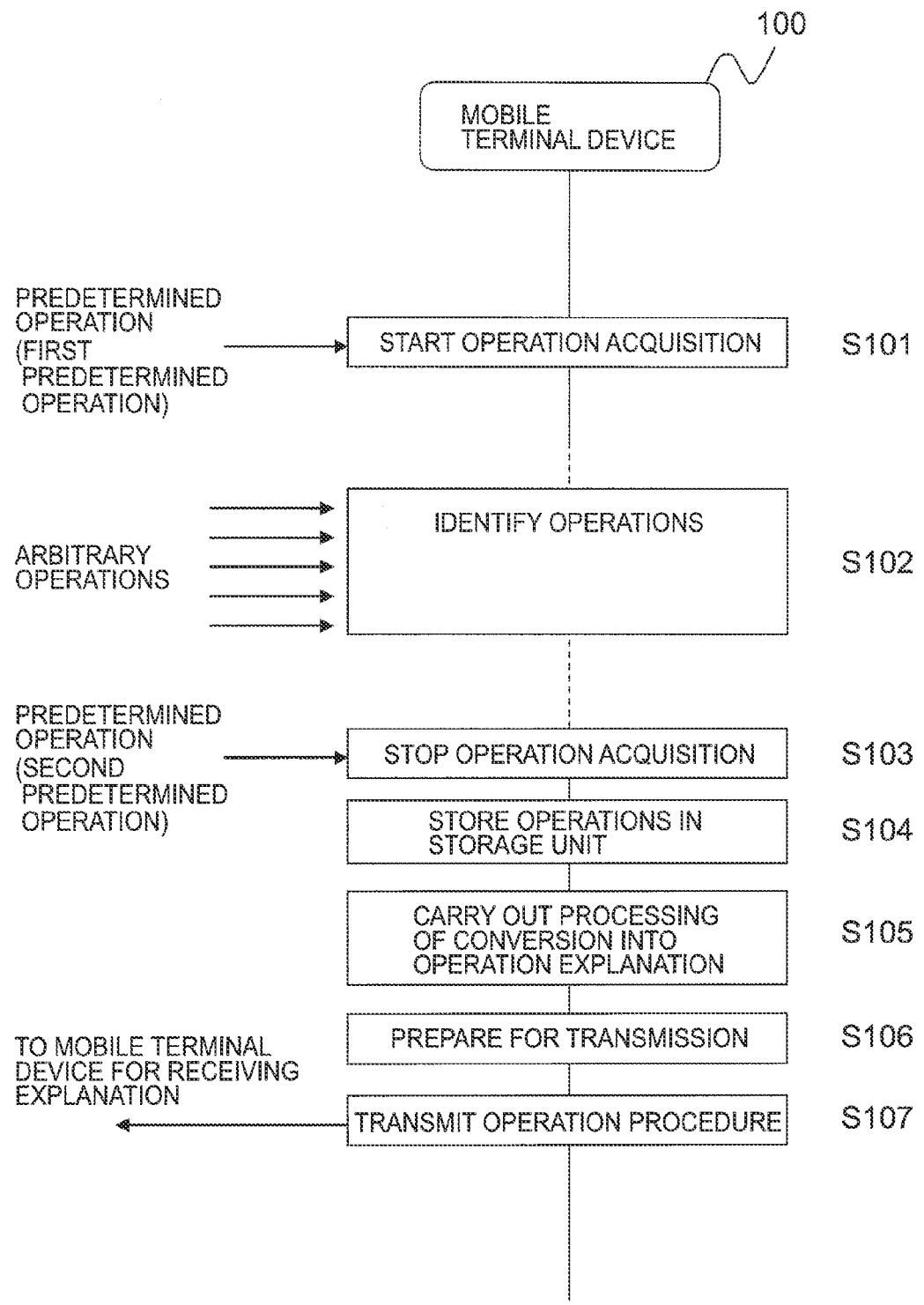
FIG. 2 is a flowchart illustrating a process of obtaining an operation explanation in the mobile terminal device 100.

FIG. 2 is a flowchart illustrating the operation of preparing or editing the operation explanation for the mobile terminal device 100. FIG. 2 illustrates an operation executed when a questioner (person asking questions) who does not know an operation(s) of the mobile terminal 200 asks an acquaintance (an answerer or a respondent) a question about an operation procedure via telephone or electronic mail, and the acquaintance (answerer) who receives the question issues an answer for it through the mobile terminal device 100 owned by the acquaintance (answerer).

In other words, description is made about the operation of the mobile terminal device 100 executed in the case where the acquaintance or answerer (bearer of the mobile terminal device 100) who receives questions from the questioner carries out an operation (first predetermined operation) for starting the reception of the input operations for the operation explanation, carries out arbitrary operations relating to the operation explanation, carries out an operation (second predetermined operation) for finishing the reception of the input operation related to the operation explanation, and then transmits the automatically converted operation explanation to the questioner.

The operation acquisition unit 110 of the mobile terminal device 100 identifies the start operation (first predetermined operation) received from the user (answerer) in response to a start instruction of starting the acquisition of the operations, and starts the acquisition of the operation (operation log) applied to the own terminal device (Step S101).

The operation acquisition unit 110 successively identifies arbitrary operations indicated from the user (Step S102).

The operation acquisition unit 110 identifies the stop operation (second predetermined operation) for finishing the operation explanation received from the user, and stops the acquisition of the operations (Step S103).

The operation acquisition unit 110 records, as the operation log, the identified operations relating to the operation explanation in the storage unit (Step S104).

The operation conversion unit 120 acquires the operation log recorded in the storage unit, converts the operation log into a text or a file reproduced in the form of a depiction, or both of the text and the file, and records the text and the file in the storage unit (Step S105).

The operation procedure transmission unit 130 cooperates with an existing mailer or the like to prepare for the transmission so that the operation explanation (data and file) acquired by the conversion in the operation conversion unit 120 can be transmitted via the transmission unit (Step S106).

Then, the mobile terminal device 100 transmits the produced or edited operation explanation by means of an electronic mail or the like to the mobile terminal device of the questioner at a time instant indicated by the user (Step S107).

Then, the mobile terminal device 200 of the questioner receives the operation explanation via the communication unit. The questioner confirms the transmitted operation explanation by using a mailer, a text reader, a browser, a JAVA (trademark) application, or the like, which operates as an operation procedure presentation unit.

The operations of the respective mobile terminal devices in this way make it possible that the answerer can easily teach the required operation procedure to the person, namely, the questioner who holds the mobile terminal and requires an operation of the mobile terminal.

In the above-mentioned description, the conversion processing of converting operations into a sentence and a file is executed by the use of the operation log temporarily stored in the storage unit. However, the conversion processing may successively convert an input operation, and may store a sentence, an image, and the like after the conversion in the storage unit.

Moreover, in the above-mentioned description, though the operations input as operation procedures are converted into a text and a file in the mobile terminal device 100, but this conversion processing may be carried out on an application server (operation explanation producing server) provided on a network. In this case, the operation conversion unit 120 may be included in a general application server. With this structure, high-load processing can be carrying out in the server, and operations can be converted into an easy-to-understand operation explanation.

A detailed description is now given of the process of conversion into a text (texting process) and the process of conversion into a file (filing process), both of which are executed by the operation conversion unit 120.

[Texting Process]

FIG. 3 is an explanatory diagram illustrating an example of an operation correspondence table used for the texting process. FIG. 3 illustrates, in addition to serial numbers, an "operation condition" column representing operations input by a user (answerer), a "displayed string" column used as a sentence for the operation explanation, and an "operation number" describing alphanumeric characters representing an actual content of operations. The operation number is a unified number unique to each operation which is assigned independently of differences among vendors and models and, in other words, which is common to the vendors and the models. The number is preferably a unified number independently of differences among operators and communication types.

The operation conversion unit 120 identifies the operation log per operation during the texting process, acquires "displayed string" corresponding to the "operation condition" column, and arranges the strings in chronological order of the operation log, thereby carrying out the texting process to obtain a text.

[Filing Process]

A description is given of an example which uses a Flash (trademark) memory so as to execute a filing process. It should be noted that the filing process may be carried out by means of a technology, such as GIF.

Figure 4:
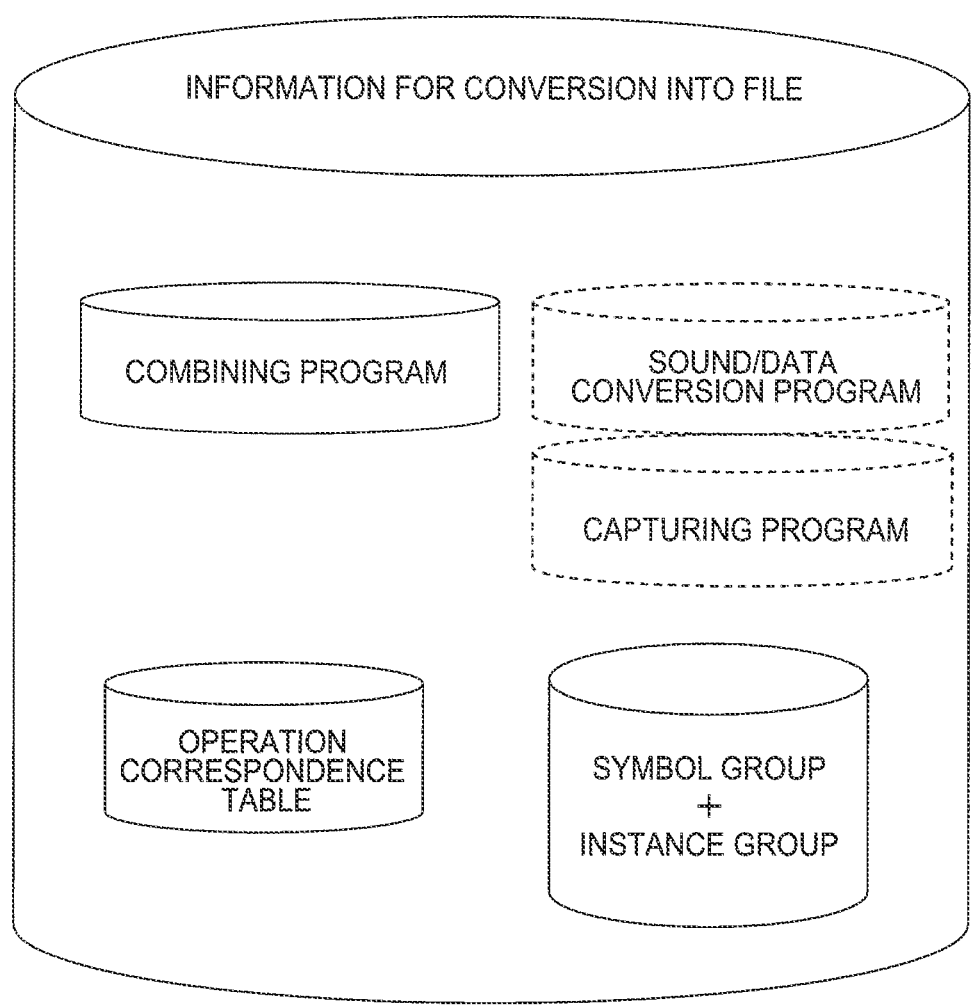
FIG. 4 is an explanatory diagram illustrating an example of data used for a filing process.

FIG. 4 is an explanatory diagram illustrating an example of information for conversion into file used for the filing process.

As illustrated in FIG. 4, the filing information stores and retains "operation correspondence table" which is a code table corresponding to an operation input by a user (an answerer), "symbol group and instance group" which are components recording, in advance, each operation to be used for the operation explanation, and a combining program for arranging and unifying symbols and instances in chronological order of the operation log.

Moreover, along with the symbols and instances, the combining program may combine snapshots of screens and recorded voices of the answerer in addition to the operation log. In this case, the filing information also stores a capturing program for acquiring snapshots of the screen, and a sound/data conversion program for converting an explanatory sound into data.

The operation conversion unit 120 identifies the operation log per operation, refers to the "operation correspondence table" during the filing process, acquires corresponding "symbols and instances", and obtains a file of an operation explanation from the "symbols and instances" along with screen displays and sound explanations.

In the case where a produced or edited file should be reduced in a capacity, instances and symbols produced in advance may be numbered and the numbers may be arranged in chronological order of the operation log, to be combined. Under the circumstances, a reproduction device side may reversely look up the numbers to acquire the instances and symbols.

As mentioned above, according to this embodiment, it is possible to obtain a mobile terminal device wherein an answerer easily teaches a required operation method to a questioner who holds a mobile terminal device.

Similarly, this embodiment can also provide an operation procedure communication system wherein an answerer easily informs a questioner of a required operation method.

A description is now given of a second embodiment.

Omission of the description would be made about portions of the description of the second embodiment which are the same as those of the first embodiment.

Figure 5:
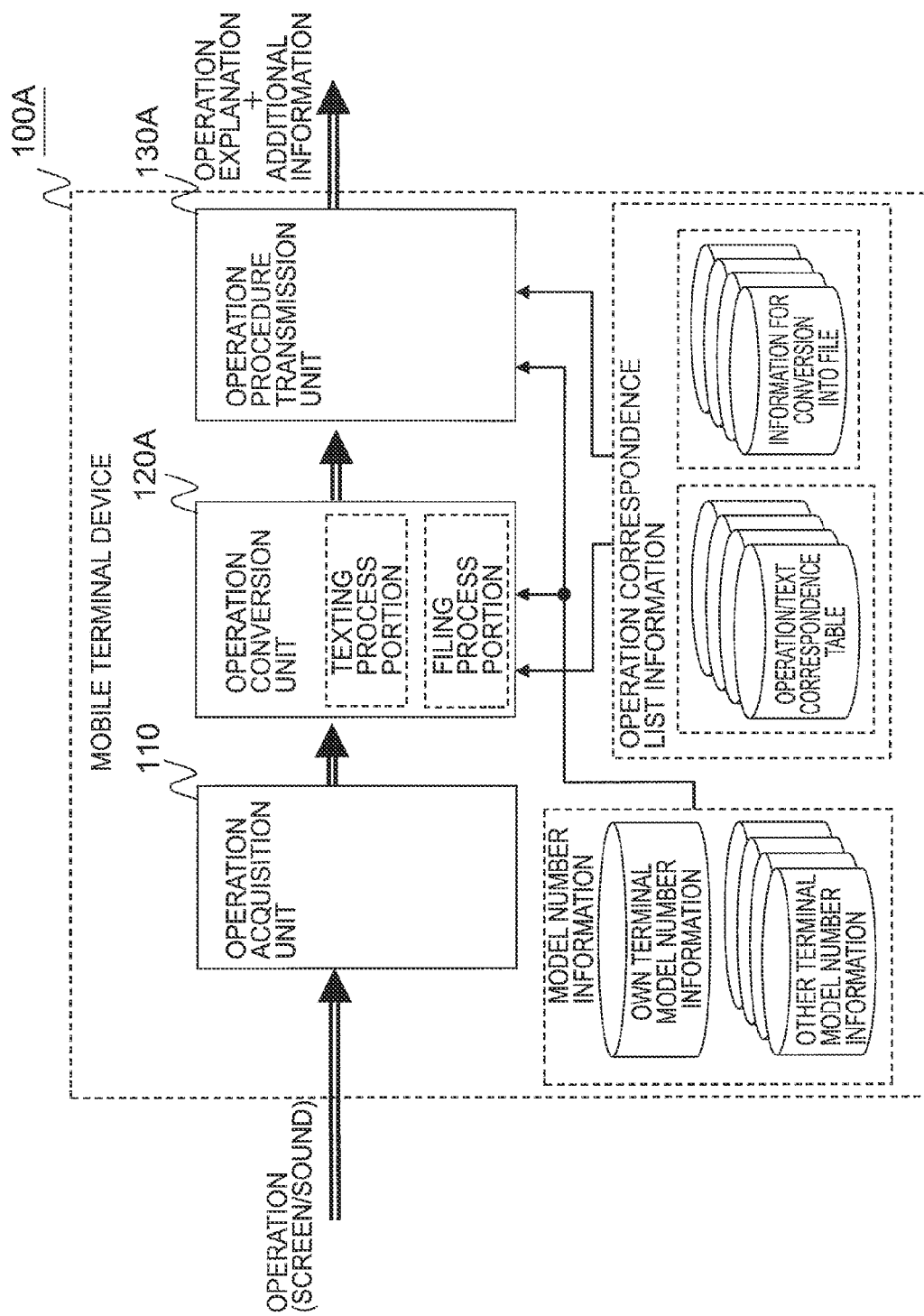
FIG. 5 is a block diagram illustrating a part of a mobile terminal device 100A according to a second embodiment.

FIG. 5 is a block diagram illustrating a part of a mobile terminal device 100A according to the second embodiment.

According to the second embodiment of this invention, provision is made about a plurality of operation correspondence lists which are used for producing or editing operation explanations for respective models and which each include operation correspondence list information. Moreover, various types of other terminal model number information and own terminal model number information, both which are included in the operation correspondence list information, are stored as model number information in the storage unit.

An operation conversion unit 120A refers to the own terminal model number information from the model number information, selects a correspondence list table and filing data, which correspond to each model, and produces an operation explanation. It should be noted that in the case where the operation conversion unit 120A cannot automatically acquire the model number information on the own terminal, the user may select the model number information via the input unit. Moreover, it is possible to provide a configuration for permitting the user to freely select an arbitrary model.

An operation procedure transmission unit 130A identifies the model of the own terminal, acquires from the storage unit additional information (such as model number information and operation numbers) relating to operation procedures corresponding to the model, and holds the operation explanation and the additional information in association with each other (S106 of FIG. 2). Then, the mobile terminal device 100A transmits the produced operation explanation and the additional information to the mobile terminal device 200 of the questioner at a time instant indicated by the user (Step S107 of FIG. 2). It should be noted that in the case where the model information on the own terminal cannot be automatically acquired, it is possible to permit the user to select the model information. Moreover, the user may be permitted to select an arbitrary model.

In this way, the meaning of an operation can be automatically added to the operation carried out in the mobile terminal device 100A by the answerer, and can be transmitted to the mobile terminal device 200 of the questioner by causing the mobile terminal device 100A of the person giving explanations to transmit the additional information along with the operation explanation.

Moreover, in the case where the answerer is familiar with the mobile terminal device 200 held by the questioner, the answerer selects the model number of the mobile terminal device 200 of the questioner, and inputs operations. In this way, the information to be used by the operation conversion unit 120A can be transmitted as an operation explanation which includes the additional information on the operation procedures corresponding to the model of the questioner. As a result, an operation explanation can be transmitted in consideration of a knowledge level and an operation capability of the questioner.

Moreover, the operation procedure transmission unit 130A can transmit the additional information related to the operation procedures to the mobile terminal device of the questioner by acquiring the operation numbers dependent on the selected model. In other words, the meaning of the operation which is dependent on the model contained in the operation log to be transmitted is transmitted to the mobile terminal device of the questioner. The operation numbers included as the additional information in this way enable the questioner to appropriately recognize what is intended by the transmitted operation explanation.

A description is now given of a third embodiment.

Portions of the description of the third embodiment which are the same as those of the first and second embodiments are omitted.

Figure 6:
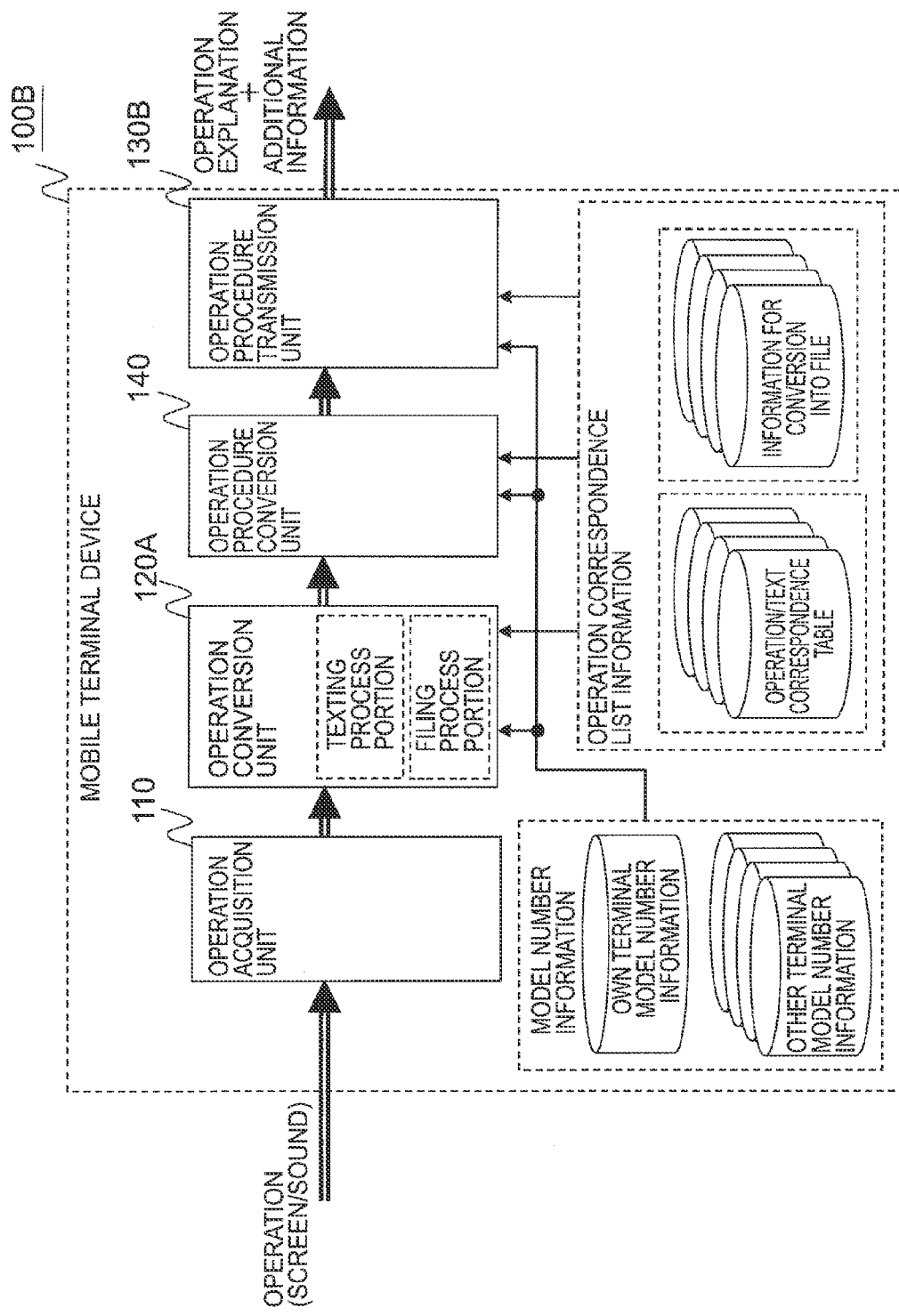
FIG. 6 is a block diagram illustrating a part of a mobile terminal device 100B according to a third embodiment.

FIG. 6 is a block diagram illustrating a part of a mobile terminal device 100B according to the third embodiment.

According to the third embodiment, an operation procedure conversion unit 140 is provided between the operation conversion unit 120A and the operation procedure transmission unit 130B in the mobile terminal device 100B.

The operation procedure conversion unit 140 acquires operation procedures from the operation conversion unit 120A, and converts a general operation explanation (general operation procedures) into an operation explanation of the mobile terminal device 200 by the use of the information related to the questioner's model which is selected by the user from the operation correspondence list information.

This configuration can absorb differences between input operations of different models by using an operation number and by carrying out converting operation. Specifically, the answerer or respondent selects a model number of the mobile terminal device of the questioner so that operations carried out on the own mobile terminal device can be automatically converted to an operation explanation for a selected mobile terminal device.

Figure 7:
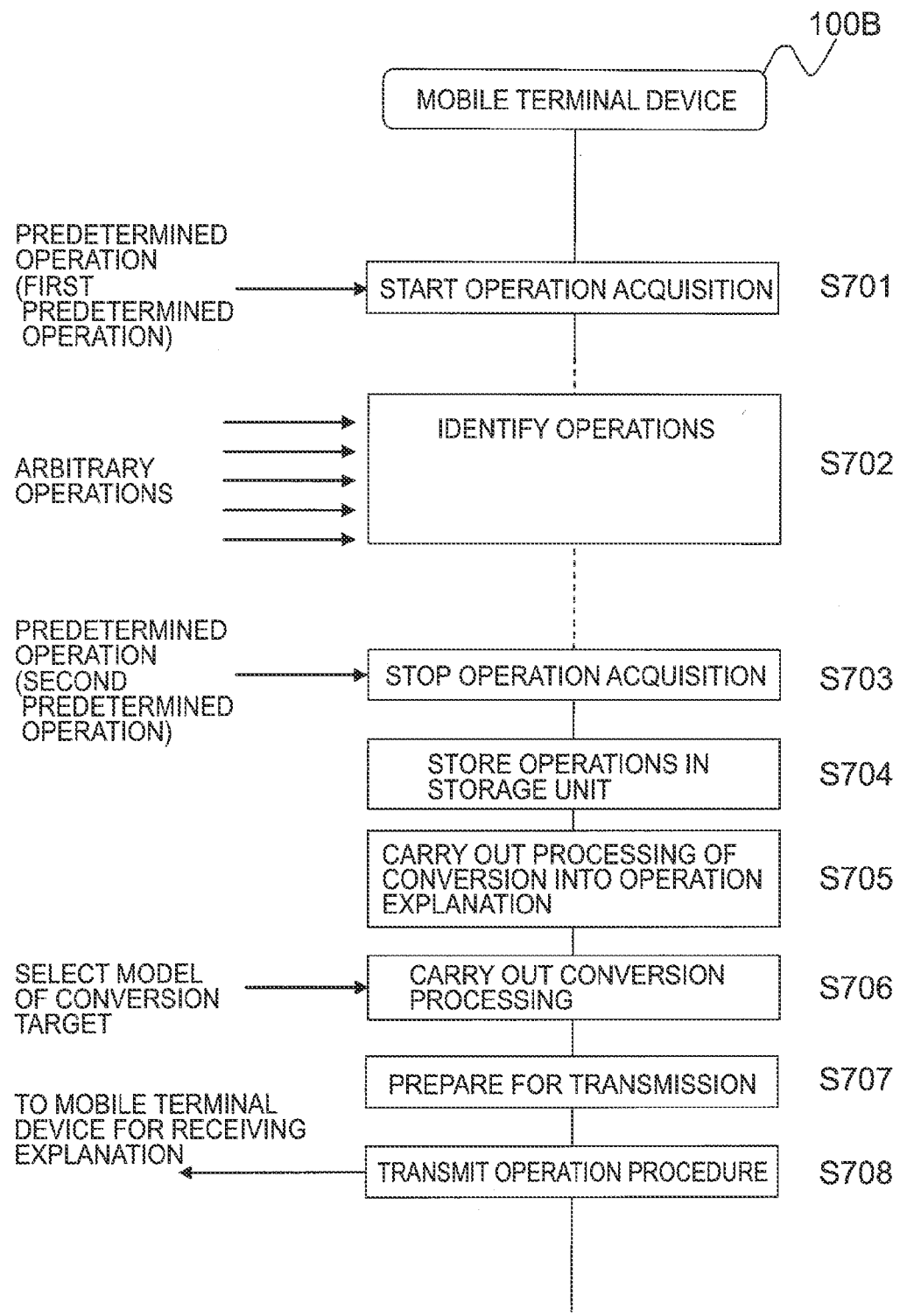
FIG. 7 is a flowchart illustrating a process of obtaining an operation explanation for the mobile terminal device 100B according to the third embodiment.

FIG. 7 is a flowchart illustrating the operation of producing the operation explanation for the mobile terminal device 100B illustrated in FIG. 6.

The mobile terminal device 100B converts operations input by the answerer into an operation explanation in Steps S701 to S705.

The operation procedure conversion unit 140 of the mobile terminal device 100B acquires the operation log (operation procedures) generated by the operation conversion unit 120A, refers to the information on the model selected by an operator (namely, the answerer) from the operation correspondence list information, and converts the operation procedures carried out on the own device into operation procedures of the selected model (Step S706). It should be noted that the model of the conversion target is selected in Step S706 of FIG. 7 but the model of the conversion target may be selected before the operation of S701 is executed.

The operation procedure transmission unit 130B of the mobile terminal device 100B acquires additional information on the operation procedures corresponding to the selected model of the conversion target from the operation correspondence list table, and holds the operation explanation and the additional information in association with each other (Step S707).

Then, the mobile terminal device 100B transmits the produced operation explanation and the additional information to the mobile terminal device 200 of the questioner at a time instant indicated by the operator (Step S708).

As a result of this operation, the operation explanation input by the answerer on the mobile terminal device 100B can be converted into similar operations of the selected model, and the meaning of these operations can be automatically added. The operation explanation along with the meaning can be transmitted to the mobile terminal device 200 of the questioner.

Now, the above-mentioned conversion processing method is exemplified. In the case of the texting process, the operation procedure conversion unit 140 extracts an operation number corresponding to an input operation, from the operations input as operation log on the mobile terminal device 100B (such as the model number 100B) by referring to an operation/text correspondence list table relating to the model number 100B. Then, the operation procedure conversion unit 140 refers to an operation/text correspondence list table relating to the model (such as model number 200) of the conversion target input by the operator, thereby acquiring a displayed string corresponding to the previously extracted operation number from the operation/text correspondence list table relating to the model number 200. It should be noted that the displayed string may be converted in place of the operation number.

In the case of the filing process, the operation procedure conversion unit 140 identifies an input operation from the operation log input as operations on the mobile terminal device 100B (such as the model number 100B) by referring to the operation correspondence table relating to the model number 100B. Then, the operation procedure conversion unit 140 acquires symbols and instances relating to the model (such as model number 200) of the conversion target input by the operator, and coverts the previously identified operation into a file to be reproduced in the form of a depiction. On this occasion, characters or phrases may be informed to the questioner about the fact that snapshots of screens and explanation sounds are not converted.

A description is now given of a fourth embodiment.

Portions of the description of the fourth embodiment which are the same as those of the first to third embodiments are omitted.

Figure 8:
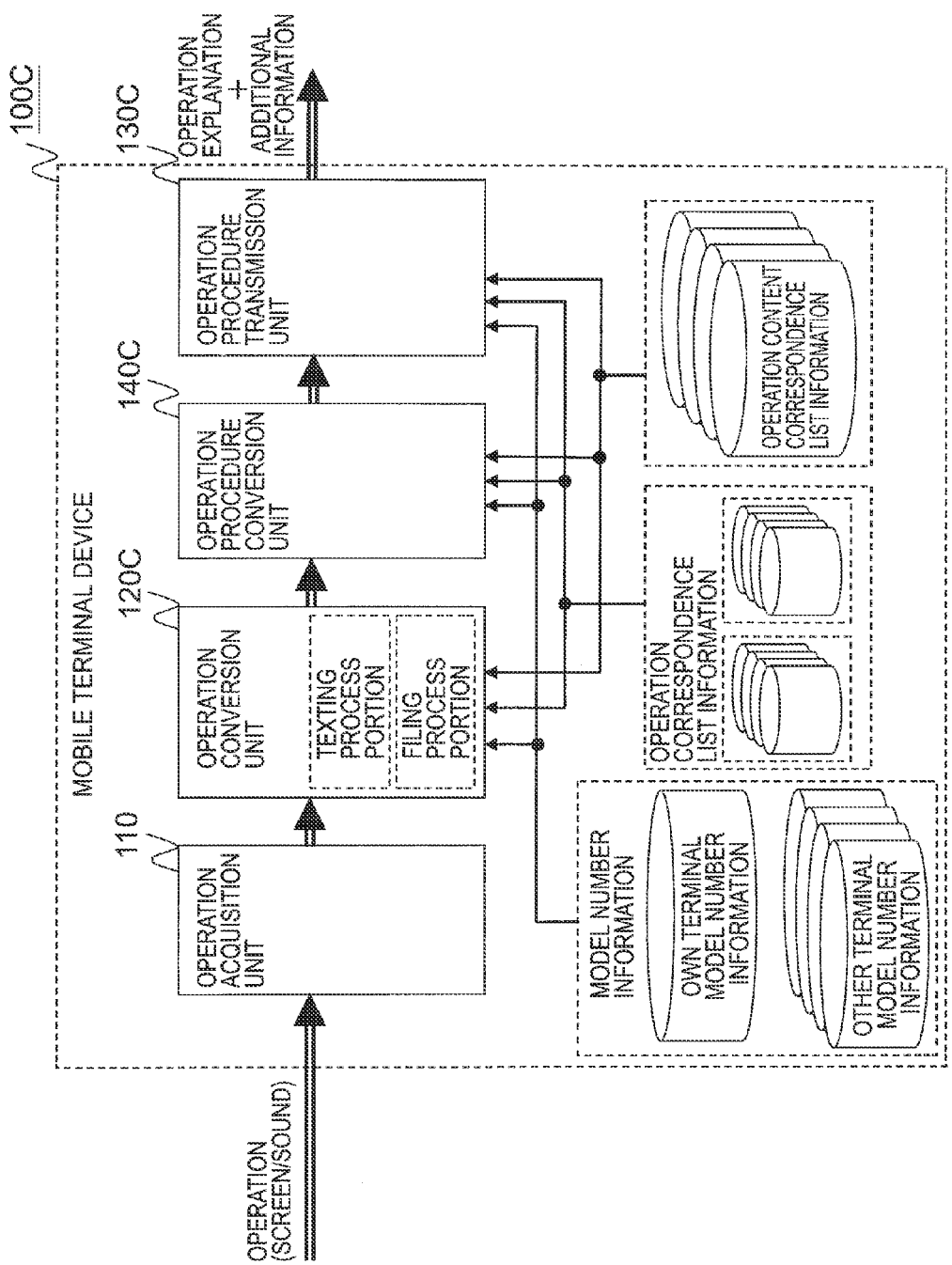
FIG. 8 is a block diagram illustrating a part of a mobile terminal device 100C according to a fourth embodiment.

FIG. 8 is a block diagram illustrating a part of a mobile terminal device 100C. Operation content correspondence list information is recorded in the storage unit of the mobile terminal device 100C according to the fourth embodiment.

The operation content correspondence list information is representative of list information which is recorded for each model and which corresponds to an operation content defined on the basis of a plurality of operations.

FIG. 9 is an explanatory diagram illustrating an example of the operation correspondence table used for a texting process according to the fourth embodiment. FIG. 9 illustrates a serial number column, an operation content column, a displayed string column, an operation number column, and a manual page column.

The operation content column records how a mobile terminal device is operated in correspondence with one or more manipulations or operations. As an operation content, are stored a corresponding operation or an intention (meaning) of an operation for one operation (such as one click of a button or selection of an icon). Moreover, an intention (meaning) corresponding to the plurality of operations is also stored as the operation content. In this event, "operation of selecting a predetermined icon in addition to an operation of moving to the icon", and "an operation of starting a predetermined function in addition to an operation of sequentially selecting a hierarchical directory" are examples of the plurality of operations. Moreover, different operation numbers may be added to the same operation content based on different operation procedures. This configuration is used to efficiently transmit an operation such as a shortcut function and the like to a questioner.

Referring to FIG. 9, there is a description that an operation number "B044"="Set vibration" for a model of a model number AAA requires three operations "Set ringtone"→"Vibration"→"Type". Moreover, there is a description that a shortcut of three operations, "Function→054→OK" is provided for an operation number "B045"="Set vibration".

This information is used to simplify an operation explanation when the operation log is converted for a questioner. In other words, the operation conversion unit 120C and the operation procedure conversion unit 140C delete or replace unnecessary operations by using this information. For example, when operations are carried out in a sequence, "→", "←", and "→", the operation conversion unit 120 and the operation procedure conversion unit 140C recognize that the operation content constituted by the plurality of operations is the same as one operation "→", and the three operations are converted into the one operation. Moreover, in another example, operation log obtained in the case where an answerer has reached an option of starting a specific function from a standard screen by trial and error is converted into the shortest route from the standard screen to the option of starting the specific function. Further, in another example, the operation number "B044" is converted into the operation number "B045". This conversion represents a conversion to an explanation in consideration of a knowledge level and operation capability of a person asking questions. The knowledge level and the operation capability of the questioner may be input by an answerer.

The manual page records a page corresponding to the operation content in an operation manual prepared for each model. The operation manual is generally prepared by a vendor as a paper manual or a PDF file, and this information is efficiently utilized.

FIG. 9 describes that "Setting ringtone" for the model type of the model number AAA is described on p. 50, and "Setting international prefix" is described on p. 502.

This information is used as the additional information for the mobile terminal device 200 owned by the questioner. In other words, the answerer can automatically transmit the page in the manual owned by the questioner.

By configuring the mobile terminal device 200C in this way, and by operating the mobile terminal device 100C as in the above-mentioned embodiment, an intention of an operation on the mobile terminal device 100C, which is input by the answerer, can be acquired to identify an operation content and to convert the operation into an operation content similar to that of a selected model, and the converted operation type can be transmitted to the mobile terminal device 200 (not shown) of a questioner.

Moreover, a corresponding page number of a manual can be communicated as the additional information. This communication enables the operator to transmit a page number of the manual for the mobile terminal device 200 owned by the questioner by inputting an operation explanation for a terminal owned by an answerer. By transmitting a page in a manual in this way, a questioner voluntarily learns an operation method, and even if a problem relating to an operation explanation is caused to occur by a difference in operation between models, the questioner can search for the manual to reduce a possibility that the questioner repeatedly asks the answerer the same question.

It should be noted that a manual converted into that in the PDF format, a corresponding page, or only a corresponding portion of the manual may be transmitted in addition to the corresponding page number of the manual.

A description is now given of a fifth embodiment.

Portions of the description of the fifth embodiment which are the same as those of the first to fourth embodiments are omitted.

An application server 300 (operation description production server) provided on a communication network is used as the operation procedure communication system according to this embodiment. The application server 300 provides a network service for producing an operation explanation for a model of a mobile terminal device, and a network service for automatically correcting a difference in operation between models.

Figure 10:
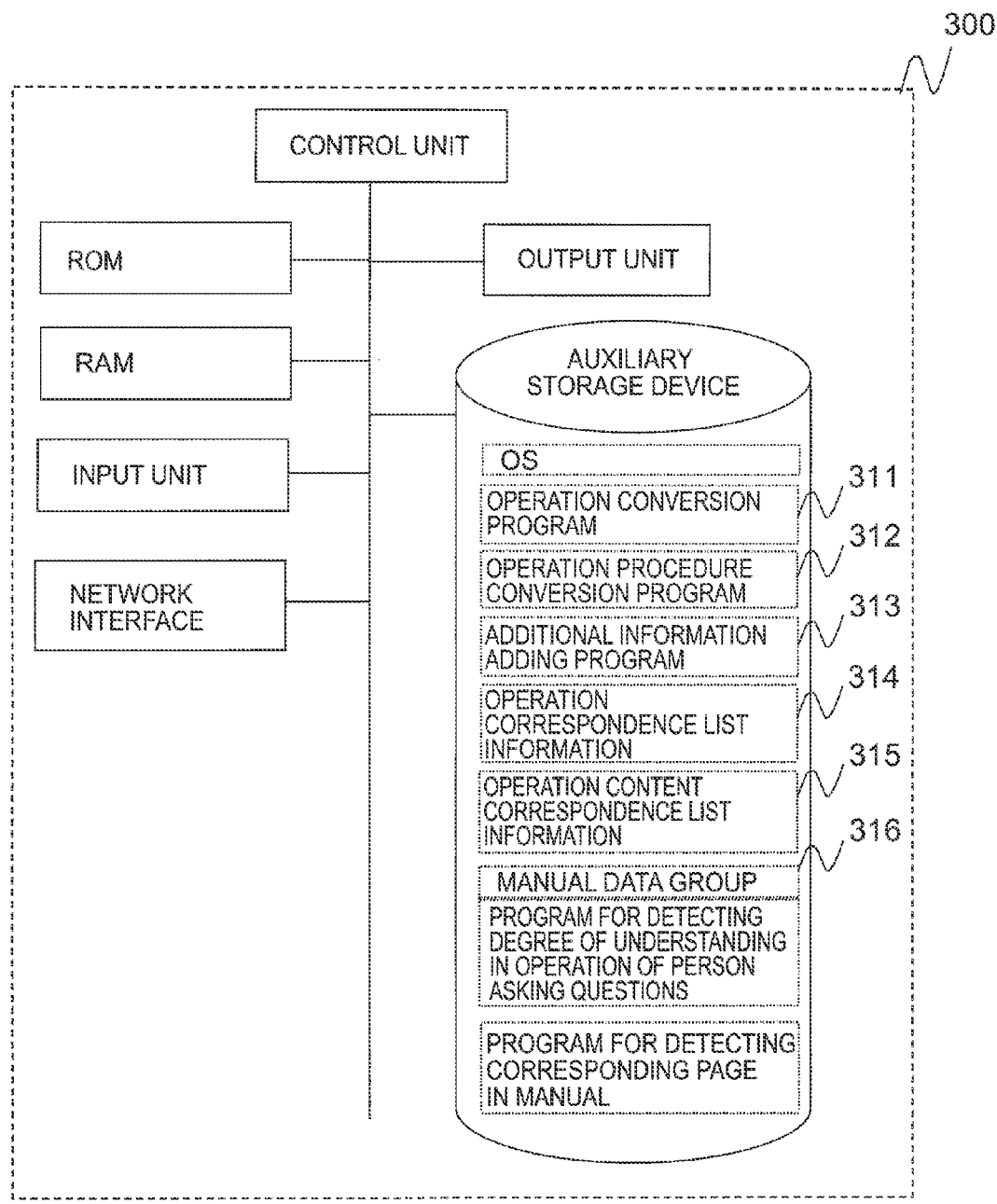
FIG. 10 is a block diagram illustrating a configuration example of an application server 300 according to a fifth embodiment.

FIG. 10 is a block diagram illustrating a configuration example of the application server 300.

The application server 300 provides functions of the operation conversion unit, the operation procedure transmission unit, and the operation procedure conversion unit of the above-mentioned embodiments. By carrying out the processing in this way by the server, a high-load processing can be carried out as compared with the processing carried out by the mobile terminal device alone, resulting in production of an operation explanation easier to understand.

A control unit of the application server 300, as the operation conversion unit, acquires operation correspondence list information 314 corresponding to a selected model based on an operation conversion program 311 and on selection of a model by an answerer or an automatic acquisition of a model. The control unit analyzes operation log transmitted via the network, and converts the operation log into an operation explanation for the selected model.

The control unit of the application server 300 is operable as the operation procedure conversion unit in accordance with an operation procedure conversion program 312. Specifically, the control unit acquires, from an auxiliary storage device, the operation correspondence list information 314 and operation content correspondence list information 315, both of which correspond to the selected model. The control unit analyzes the operation explanation converted, and converts the operation explanation into an operation explanation of the selected model.

The control unit of the application server 300 is also operable as the operation procedure transmission unit. In this case, the control unit acquires the operation correspondence list information 314 and the operation content correspondence list information 315 based on an additional information adding program 313, and transmits the operation explanation and the additional information to a designated transmission destination via the network. The control unit of the application server 300 may include a convertible manual data group 316. In this event, the control unit may extract a corresponding page of a manual according to a manual corresponding page detection program and may transmit the page as additional information.

Moreover, the control unit of the application server 300 may carry out conversion in consideration of a knowledge level and operation capability of a questioner according to a program of detecting degree of understanding operation of questioners, which causes an answerer to select a knowledge level and operation capability of an owner (questioner) of an information processing device of the transmission destination.

Moreover, a conversion is made in consideration of the knowledge level and the operation capability. Specifically, the conversion can be carried out by causing the questioner himself or herself to make access to the server 300 and to thereby select the knowledge level and the operation capability.

The operation procedure communication system configured as described above operates as briefly described below.

The information processing device communicating an operation procedure transmits an operation explanation to the application server 300. The application server 300 converts the received operation explanation into an operation explanation corresponding to the selected model, and transmits the converted operation explanation to the transmission destination via an electronic mail or a browser. The questioner confirms the transmitted operation explanation on the own information processing device. It should be noted that the questioner (namely, information processing device) may select any one of character information (text) and a moving image (file) as an operation explanation, and the operation conversion processing and the operation procedure conversion processing may be carried out based on the selection.

A description is now given of this invention by presenting some examples.

An operation procedure of a mobile phone is communicated in Example 1. On this occasion, an answerer (user A) has a mobile terminal device of a model number AA, and a questioner (user B) has a mobile phone device of a model number BB.

Configurations of the mobile terminal device AA and the mobile phone device BB are the same as a configuration of an existing mobile phone device, and the mobile terminal device AA and the mobile phone device BB include a CPU, a memory, a communication unit, a screen, key buttons, and a camera module, and operate based on software.

Moreover, the mobile terminal device AA includes an operation acquisition unit for identifying and storing inputs to the own terminal and various states of the own terminal during a period from application of a first predetermined operation to application of a second predetermined operation, an operation conversion unit for converting the operation log stored by the operation acquisition unit into a text and/or a file for reproducing the operation log as depiction, and an operation procedure transmission unit for transmitting via communication means the operation explanation acquired by the conversion by the operation conversion unit.

The mobile phone BB includes an operation procedure presenting unit for presenting a user the operation explanation transmitted from the mobile terminal device AA via the communication means.

Each of the units is constituted by hardware or cooperation of software and hardware such as a CPU and a memory. Moreover, the software may be recorded in a recording media such as a memory, and may be portable. Further, a corresponding program may be downloaded as an operation explanation application program and the like via a communication network.

Figure 11:
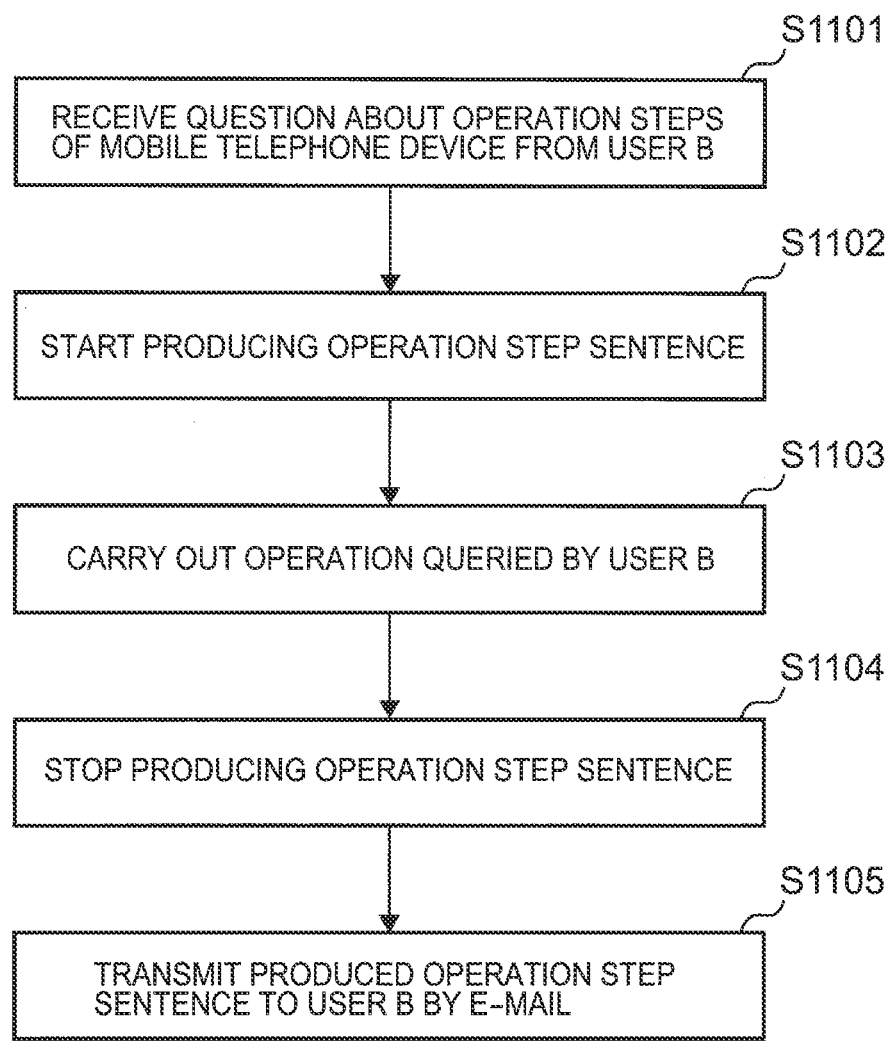
FIG. 11 is a flowchart illustrating a process of an operation procedure communication system according to the first embodiment.
Figure 12:
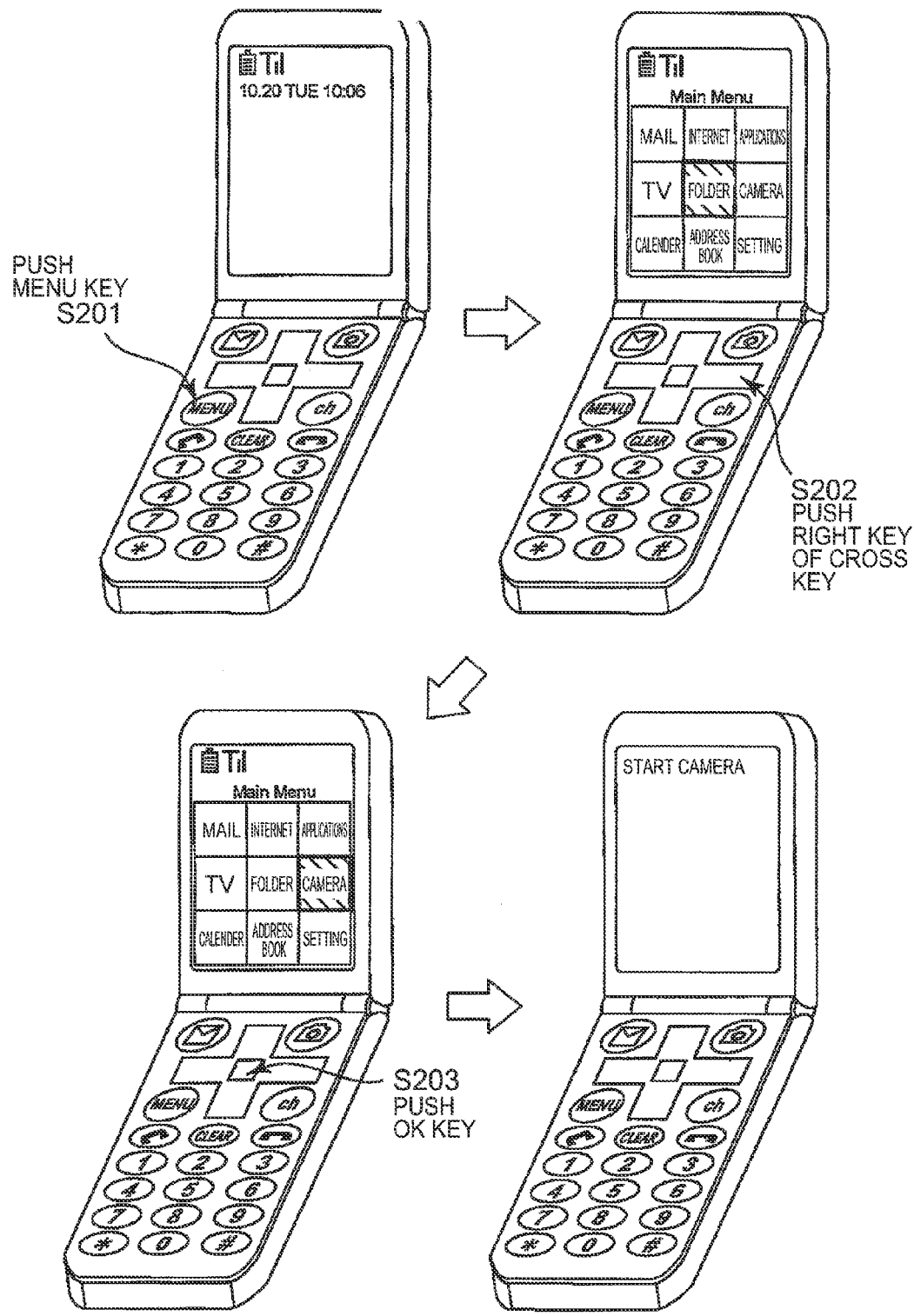
FIG. 12 is an explanatory diagram illustrating an example of operation procedures of starting a camera according to the first embodiment.

A description of an operation of the operation procedure communication system according to Example 1 is given by referring to a flowchart of FIG. 11, an operation procedure example of starting a camera of FIG. 12, and a sentence conversion example of the operation of starting camera of FIG. 13.

In S1101 of the flowchart, the user A receives from the user B a query relating to operation procedures for a portable telephone device. The user B issues a query relating to the operation procedures for starting the camera in this example.

Then, in S1102, the user A starts an operation explanation application program and the like, thereby starting production of an operation procedure sentence (inputting a first predetermined operation). The production of the operation procedure sentence may be started by selection on a menu of the operation explanation application, depressing a specific key button for a long period, or by providing a dedicated button and depressing the dedicated button, and the method of the start is not limited thereto. A description of the example made about the case where the production of the operation procedure sentence is started by selection on a menu.

After the user A selects the production of the operation procedure sentence from the menu, the user A carries out an operation of starting the camera on the mobile phone device AA in S1103.

On this occasion, a description is given of the operation of starting the camera by referring to operation procedures of starting the camera of FIG. 11. In S201 in FIG. 12, when a MENU key of the mobile phone device is depressed, a screen of the mobile phone device AA switches to a screen for Main Menu. Then, a right key of a cross key is depressed in S202. On this occasion, a cursor moves to a camera menu on the screen. Then, a camera function is started by depressing a center button of the cross key in S203.

After the operation of starting the camera is carried out, input of an operation explanation is finished by a predetermined operation (input of the second predetermined operation) corresponding to S1104 of the flowchart.

The production of the operation procedure sentence may be finished by selection on a menu, by holding a specific key button for a long period, or by providing a dedicated button and depressing the dedicated button, and the method of the finishing is not limited thereto.

Then, the mobile terminal device AA automatically produces an operation procedure sentence, and transmits the produced operation procedure sentence as a body or an attachment by means of the electronic mail to the mobile terminal device in S1105 of the flowchart.

The mobile terminal device BB receives the electronic mail, refers to the body or the attachment, and presents the explained content to the user. The user B can recognize the operation procedures of starting the camera, which the user B did not know, by reading the electronic mail.

As a result of this operation, a series of operations are converted into a sentence as illustrated in the example of the conversion into sentence of the camera starting operation in FIG. 13, for example. This shows that a required operation procedure is easily taught to a questioner.

Moreover, labor and a period required for the conversion into sentence can be reduced as compared with the case where entire operation procedures are explained by manual input. Moreover, the conversion into sentence is carried out based on an actual operation, and a problem of a missing operation procedure, which can occur during the manual input, can be solved.

A description is now given of another example.

Figure 14:
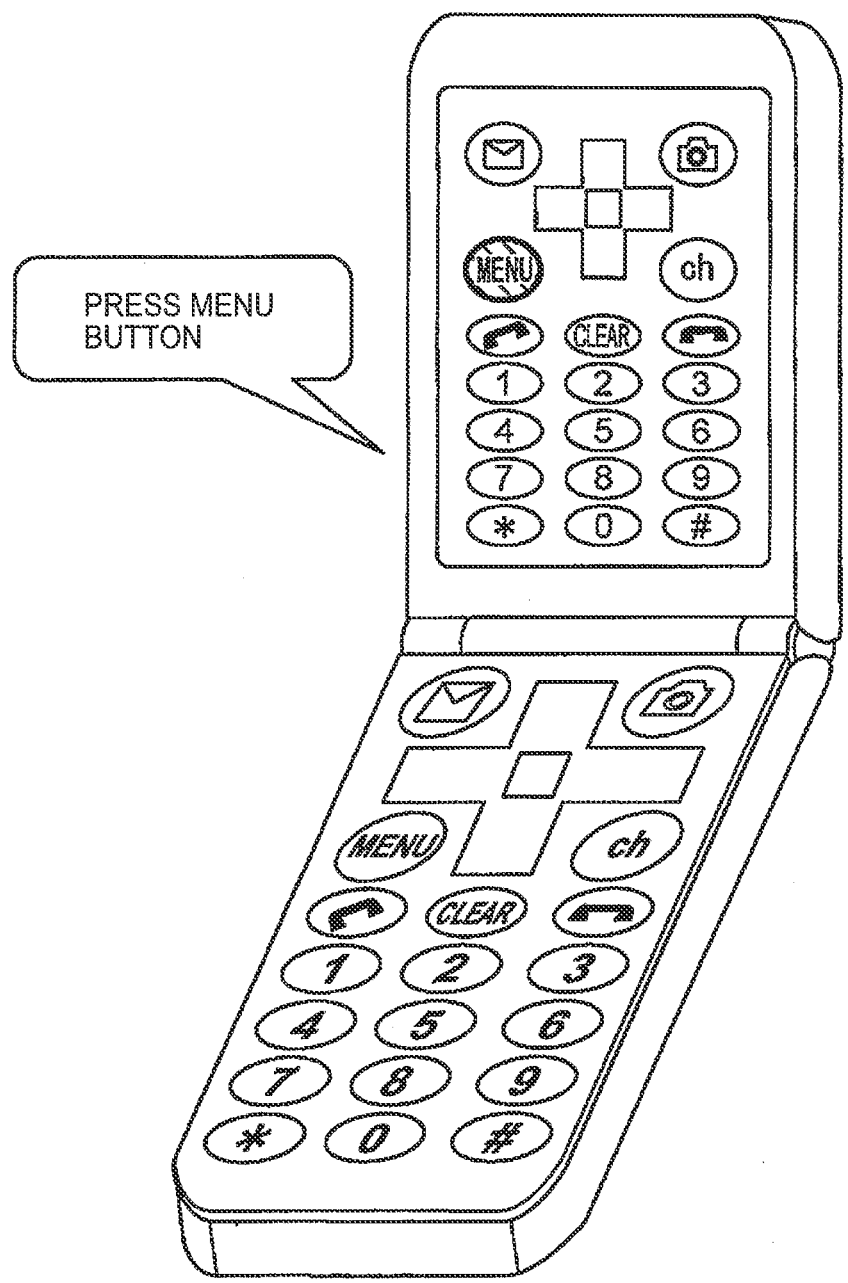
FIG. 14 is an explanatory diagram schematically illustrating an operation of a terminal device of person asking questions according to the second embodiment.

Example 2 produces a file explaining operation procedures in which a screen display and a sound are combined as illustrated in FIG. 14, by using an application service for combining a moving image and a sound, and transmitting and receiving the combined moving image and sound such as the i motion (trademark) or the like. The sound can be automatically added out of the sound of an answerer and an explanation sound prepared in operation correspondence list data. Then, the mobile terminal device AA attaches the produced file explaining the operation procedures to an electronic mail, and transmits the file to the mobile terminal device BB, and the user A reproduces the attached file explaining the operation procedures by using the similar application. The operation explanation can be carried out by means of a moving image and the Flash in addition to the text by the operation in this way.

As described above, a mobile terminal device according to this invention facilitates to teach a required operation procedure to a person (questioner) holding a mobile terminal device an operation of which is being required can be provided.

This invention can also provide an operation procedure communication system for facilitating to teach a requested operation procedure to a questioner holding the mobile terminal device on which the person wants to apply the operation.

Note that, specific configurations of this invention are not limited to the above-mentioned embodiments, and changes within the scope that does not depart from the gist of the invention are also included in this invention.

Further, a combination of the respective characteristics of the above-mentioned embodiments may be included in this invention.

[Note 1]

A mobile terminal device, including:
  an operation acquisition unit for identifying and storing an operation applied to the own mobile terminal device in a period from application of a first predetermined operation to application of a second predetermined operation;
  an operation conversion unit for converting operation log stored by the operation acquisition unit into a sentence; and
  an operation procedure transmission unit for transmitting an operation explanation acquired by the conversion into the sentence by the operation conversion unit via communication means.

[Note 2]

A mobile terminal device as described in the above-mentioned note, in which:
  the operation acquisition unit identifies and stores, in addition to the operation applied to the own mobile terminal device, a screen display and/or a sound during the operation in the period from the application of the first predetermined operation to the application of the second predetermined operation;
  the operation conversion unit converts the operation log stored by the operation acquisition unit into a file for reproducing as a depiction the operation carried out between the first predetermined operation and the second predetermined operation; and
  the operation procedure transmission unit transmits the operation explanation converted into the file by the operation conversion unit via the communication means to a terminal of the person receiving explanations.

[Note 3]

A mobile terminal device as described in any one of the above-mentioned notes, in which the operation procedure transmission unit identifies a model of the own mobile terminal device, acquires additional information relating to an operation procedure corresponding to the model, and transmits the operation explanation and the additional information to the terminal of the person receiving explanations.

[Note 4]

A mobile terminal device as described in any one of the above-mentioned notes, in which the operation procedure transmission unit identifies a model of the terminal of the person receiving explanations selected by an operator, acquires additional information relating to an operation procedure corresponding to the model, and transmits the operation explanation and the additional information to the terminal of the person receiving explanations.

[Note 5]

A mobile terminal device as described in any one of the above-mentioned notes, in which the operation procedure transmission unit acquires an operation number common to models of mobile terminal devices from operation correspondence list information stored and held in advance, acquires additional information on an operation procedure corresponding to the own mobile terminal device or the terminal of the person receiving explanations, and transmits the operation explanation and the additional information to the terminal of the person receiving explanations.

[Note 6]

A mobile terminal device as described in any one of the above-mentioned notes, further including an operation procedure conversion unit for acquiring, based on selection of a model of the terminal of the person receiving explanations, operation correspondence list information corresponding to the selected model, and converting the operation explanation output from the operation conversion unit into an operation explanation for the selected model.

[Note 7]

A mobile terminal device as described in any one of the above-mentioned notes, in which the operation procedure transmission unit acquires, from data storing and holding in advance a page number of a manual produced for a mobile terminal device, additional information on an operation procedure corresponding to the terminal of the person receiving explanations, and transmits the operation explanation and a page number of the manual corresponding to each operation procedure to the terminal of the person receiving explanations.

[Note 8]

An operation procedure communication system, including:
  an information processing device for communicating an operation procedure, including:
    an operation acquisition unit for identifying and storing an input applied to an own terminal device and various states of the own terminal device in a period from application of a first predetermined operation to application of a second predetermined operation;
    an operation conversion unit for converting operation log stored by the operation acquisition unit into a text and/or a file to be reproduced as depiction; and
    an operation procedure transmission unit for transmitting an operation explanation acquired by the conversion by the operation conversion unit via communication means; and
  an information processing device for receiving the operation procedure, including an operation procedure presenting unit for presenting the operation explanation transmitted from the information processing device for communicating the operation procedure and acquired via the communication means to a user.

[Note 9]

An operation procedure communication system as described in the above-mentioned note, in which the operation procedure transmission unit identifies a model of the own terminal device, acquires additional information relating to an operation procedure corresponding to the model, and transmits the operation explanation and the additional information to the information processing device for receiving the operation procedure.

[Note 10]

An operation procedure communication system as described in any one of the above-mentioned notes, in which the operation procedure transmission unit identifies a model of the information processing device for receiving the operation procedure selected by an operator, acquires additional information relating to an operation procedure corresponding to the model, and transmits the operation explanation and the additional information to the information processing device for receiving the operation procedure.

[Note 11]

An operation procedure communication system as described in any one of the above-mentioned notes, in which the operation procedure transmission unit acquires an operation number common to models of information processing devices from operation correspondence list information stored and held in advance, acquires additional information on an operation procedure corresponding to the own terminal device or the information processing device for receiving the operation procedure, and transmits the operation explanation and the additional information to the information processing device for receiving the operation procedure.

[Note 12]

An operation procedure communication system as described in any one of the above-mentioned notes, further including a server including an operation procedure conversion unit for acquiring, based on selection of a model from the information processing device for communicating the operation procedure, operation correspondence list information corresponding to the selected model, and converting the operation explanation output from the information processing device for communicating the operation procedure into an operation explanation for the selected model, in which:
  the information processing device for communicating the operation procedure transmits an operation explanation to the server; and
  the server converts the received operation explanation into an operation explanation corresponding to a model of the information processing device for receiving the operation procedure, and transmits the converted operation explanation to the information processing device for receiving the operation procedure.

[Note 13]

An operation procedure communication system as described in any one of the above-mentioned notes, in which the server acquires, from data storing and holding in advance a page number of a manual produced for each information processing device, additional information on an operation procedure corresponding to the information processing device receiving the operation procedure, and transmits the page number of the manual for each operation explanation along with the operation explanation.

[Note 14]

An operation communication method of communicating an operation from a mobile terminal device of a person giving explanations to a terminal of a person receiving explanations, the operation communication method including the steps of:
- identifying and storing an operation applied to an own terminal device and/or a screen display and a sound during the operation in a period from application of a first predetermined operation to application of a second predetermined operation;
- converting stored operation log into a sentence and/or a file to be reproduced as a depiction; and
- transmitting the operation explanation converted into the sentence and/or the file via communication means.

[Note 15]

An operation communication method as described in the above-mentioned note, in which the mobile terminal device of the person giving explanations identifies a model of the own mobile terminal device, acquires additional information relating to an operation procedure corresponding to the model, and transmits the operation explanation and the additional information to the terminal of the person receiving explanations.

[Note 16]

An operation communication method as described in any one of the above-mentioned notes, in which the mobile terminal device of the person giving explanations identifies a model of the terminal of the person receiving explanations selected by an operator, acquires additional information relating to an operation procedure corresponding to the model, and transmits the operation explanation and the additional information to the terminal of the person receiving explanations.

[Note 17]

An operation communication method as described in any one of the above-mentioned notes, in which the mobile terminal device of the person giving explanations acquires an operation number common to models of mobile terminal devices from operation correspondence list information stored and held in advance, acquires additional information on an operation procedure corresponding to the own mobile terminal device or the terminal of the person receiving explanations, and transmits the operation explanation and the additional information to the terminal of the person receiving explanations.

[Note 18]

An operation communication method as described in any one of the above-mentioned notes, further including the step of acquiring, based on selection of a model of the terminal of the person receiving explanations, operation correspondence list information corresponding to the selected model, and converting the operation explanation output from the operation conversion unit into an operation explanation for the selected model.

[Note 19]

An operation communication method as described in any one of the above-mentioned notes, in which the mobile terminal device of the person giving explanations acquires, from data storing and holding in advance a page number of a manual produced for a mobile terminal device, additional information on an operation procedure corresponding to the terminal of the person receiving explanations, and transmits the operation explanation and a page number of the manual corresponding to each operation procedure to the terminal of the person receiving explanations.

[Note 20]

An operation communication method as described in any one of the above-mentioned notes, further including the step of acquiring, based on selection of a model, operation correspondence list information corresponding to the selected model, and transmitting the operation correspondence list information to a server for converting the operation explanation output from the mobile terminal device of the person giving explanations into an operation explanation for the selected model, in which:
- the mobile terminal device of the person giving explanations transmits the operation explanation to the server; and
- the server converts the received operation explanation into an operation explanation corresponding to a model of the terminal of the person receiving explanations, and transmits the converted operation explanation to the terminal of the person receiving explanations.

This application claims priority from Japanese Patent Application No. 2010-029751, filed on Feb. 15, 2010, the entire disclosure of which is incorporated herein by reference.

REFERENCE SIGNS LIST

100 mobile terminal device (for a person giving explanations)
110 operation acquisition unit
120 operation conversion unit
130 operation procedure transmission unit
140 operation procedure conversion unit
200 mobile terminal device (for a person asking questions)
300 application server

The invention claimed is:

1. A mobile terminal device, comprising:
   an operation acquisition unit which identifies and stores an operation applied to the own mobile terminal device in a period from application of a start application operation to application of a stop application operation;
   an operation conversion unit which converts an operation log stored by the operation acquisition unit into data which is used as an operation explanation and is to be presented to a person receiving explanations; and
   an operation procedure transmission unit which transmits the operation explanation converted into the data by the operation conversion unit, and
   wherein the operation procedure transmission unit acquires an operation number associated with models of mobile terminal devices from operation correspondence list information stored and held in advance, acquires additional information on an operation procedure corresponding to the own mobile terminal device or the terminal of the person receiving explanations so that the additional information includes at least the operation number, and transmits the operation explanation and the additional information to the terminal of the person receiving explanations.

2. A mobile terminal device according to claim 1, wherein:
   the operation acquisition unit identifies and stores, in addition to the operation applied to the own mobile terminal device, a screen display and/or a sound during the operation in the period from the application of the start application operation to the application of the stop application operation;
   the operation conversion unit converts the operation log stored by the operation acquisition unit into a sentence to be displayed and/or a file to be reproduced in the form of a depiction, as the operation carried out between the start application operation and the stop application operation; and the operation procedure transmission unit transmits the operation explanation converted into the sentence or the file by the operation conversion unit to a terminal of the person receiving explanations.

3. A mobile terminal device according to claim 2, wherein the operation procedure transmission unit identifies a model of the own mobile terminal device, acquires additional information relating to an operation procedure corresponding to the model, and transmits the operation explanation and the additional information to the terminal of the person receiving explanations.

4. A mobile terminal device according to claim 2, wherein the operation procedure transmission unit identifies a model of the terminal of the person receiving explanations selected by an operator, acquires additional information relating to an operation procedure corresponding to the model so that the additional information includes at least an operation number, and transmits the operation explanation and the additional information to the terminal of the person receiving explanations.

5. A mobile terminal device according to claim 2, further comprising an operation procedure conversion unit which acquires, based on selection of a model of the terminal of the person receiving explanations, operation correspondence list information corresponding to the selected model, and which converts the operation explanation output from the operation conversion unit into an operation explanation for the selected model.

6. A mobile terminal device according to claim 2, wherein the operation procedure transmission unit acquires, from data storing and holding in advance information on a manual produced for the terminal of the person receiving explanations, information on a portion of the manual describing an operation to be explained corresponding to the terminal of the person receiving explanations as additional information, and transmits the operation explanation and information on a portion of the manual corresponding to each operation explanation to the terminal of the person receiving explanations.

7. An operation procedure communication system, comprising:
   an information processing device which communicates with an operation procedure, comprising:
   an operation acquisition unit which identifies and stores an input applied to an own terminal device and each state of the own terminal device in a period from application of a start application operation to application of a stop application operation;
   an operation conversion unit which converts an operation log stored by the operation acquisition unit into a text and/or a file to be reproduced in the form of a depiction; and
   an operation procedure transmission unit which transmits an operation explanation acquired by the conversion in the operation conversion unit; and
   an information processing device which receives the operation procedure, comprising an operation procedure presenting unit which presents the operation explanation transmitted from the information processing device for communicating the operation procedure and acquired via the communication means to a user, and wherein the operation procedure transmission unit acquires an operation number associated with models of mobile terminal devices from operation correspondence list information stored and held in advance, acquires additional information on an operation procedure corresponding to the own mobile terminal device or the terminal of the person receiving explanations so that the additional information includes at least the operation number, and transmits the operation explanation and the additional information to the terminal of the person receiving explanations.

8. An operation procedure communication system according to claim 7, further comprising a server comprising:
   an operation procedure conversion unit which acquires, based on selection of a model from the information processing device for communicating the operation procedure, operation correspondence list information corresponding to the selected model, and which converts the operation explanation output from the information processing device for communicating the operation procedure into an operation explanation for the selected model,
   wherein:
   the information processing device for communicating the operation procedure transmits information on a model of a conversion target and the generated operation explanation to the server; and
   the server converts the received operation explanation into an operation explanation corresponding to a model of the information processing device for receiving the operation procedure, and transmits the converted operation explanation to the information processing device for receiving the operation procedure.

9. An operation communication method of communicating an operation from a mobile terminal device of a person giving explanations to a terminal of a person receiving explanations, the operation communication method comprising the steps of:
   identifying and storing an operation applied to an own terminal device and/or a screen display and/or a sound during the operation in a period from application of a start application operation to application of a stop application operation;
   converting a stored operation log into a sentence and/or a file to be reproduced in the form of a depiction;
   acquiring an operation number associated with models of mobile terminal devices from operation correspondence list information stored and held in advance;
   acquiring additional information on an operation procedure corresponding to the own mobile terminal device or the terminal of the person receiving explanations so that the additional information includes at least the operation number, and
   transmitting the operation explanation converted into the sentence and/or the file.

* * * * *